United States Patent [19]

Matsumura et al.

[11] Patent Number: 4,737,003
[45] Date of Patent: Apr. 12, 1988

[54] OPTICAL SWITCHING DEVICE UTILIZING MULTIPLE QUANTUM WELL STRUCTURES BETWEEN INTERSECTING WAVEGUIDES

[75] Inventors: Hiroyoshi Matsumura, Iruma; Naoki Chinone, Hachioji; Koji Ishida, Musashino, all of Japan

[73] Assignee: Hitachi, Ltd., Tokyo, Japan

[21] Appl. No.: 684,784

[22] Filed: Dec. 21, 1984

[30] Foreign Application Priority Data

Dec. 23, 1983 [JP] Japan ................. 58-242049

[51] Int. Cl.$^4$ ............... G02B 6/10; G02F 1/01; H01L 27/12
[52] U.S. Cl. .................. 350/96.14; 350/96.11; 350/96.12; 350/96.13; 350/354; 350/355; 357/4; 357/30; 357/4 SL
[58] Field of Search ........... 350/96.10, 96.11, 96.12, 350/96.13, 96.14, 354, 355, 356; 372/43, 44, 45, 46, 47, 48, 50; 357/16, 17, 25, 30, 45, 48, 4, 4 SL

[56] References Cited

U.S. PATENT DOCUMENTS

| | | | |
|---|---|---|---|
| 3,790,853 | 2/1974 | Pankove | 357/30 |
| 3,837,728 | 9/1974 | Logan et al. | 350/96.13 X |
| 3,872,400 | 3/1975 | Glausecker et al. | 357/4 X |
| 3,970,364 | 7/1976 | Gerson et al. | 357/30 X |
| 3,976,358 | 8/1976 | Thompson | 350/96.13 |
| 4,130,342 | 12/1978 | McMahon | 350/96.14 |
| 4,152,713 | 5/1979 | Copeland, III et al. | 350/96.10 X |
| 4,172,630 | 10/1979 | Burns et al. | 350/96.15 |
| 4,190,811 | 2/1980 | Alcock et al. | 350/354 X |
| 4,205,331 | 5/1980 | Esaki et al. | 357/30 |
| 4,208,667 | 6/1980 | Chang et al. | 357/4 X |
| 4,521,069 | 6/1985 | Ikeda | 350/96.13 |
| 4,525,687 | 6/1985 | Chemla et al. | 357/16 X |
| 4,546,244 | 10/1985 | Miller | 350/354 X |
| 4,549,788 | 10/1985 | Chemla | 350/354 |
| 4,626,075 | 12/1986 | Chemla | 350/354 |
| 4,688,068 | 8/1987 | Chaffin et al. | 357/30 |
| 4,693,547 | 9/1987 | Soref et al. | 350/96.13 |

FOREIGN PATENT DOCUMENTS

| | | | |
|---|---|---|---|
| 0143000 | 11/1984 | European Pat. Off. | 350/354 X |
| 0155802 | 9/1985 | European Pat. Off. | 350/354 X |
| 0154504 | 9/1985 | European Pat. Off. | 350/96.14 X |
| 0193333 | 9/1986 | European Pat. Off. | 350/96.11 |
| 2321138 | 3/1977 | France | 350/96.14 |
| 54-7951 | 1/1979 | Japan | 350/96.14 |
| 54-33738 | 3/1979 | Japan | 350/96.10 |
| 56-66818 | 6/1981 | Japan | 350/96.14 |
| 58-40725 | 9/1983 | Japan | 350/96.13 |
| 8302024 | 7/1984 | PCT Int'l Appl. | 350/354 |

OTHER PUBLICATIONS

Naitou et al., "Mirror-Type Optical Switch Array", Applied Optics, vol. 17, No. 24, 12/78, pp. 3975-3978.
Esaki et al., "Electrically Driven Thin Film Structure . . . .", IBM Tech. Discl. Bull., vol. 14, No. 12, 5/72, p. 3786.
Chang et al., "GHz Bandwidth Optical Channel Waveguide . . . ", Conf. Int. and Guided Wave Optics, Pacific Grove (A. 1/82), pp. 1-4.
McFee et al., "Beam Deflection and Amplitude Modulation . . . ", Appl. Phys. Lett., vol. 23, No. 10, 11/73, pp. 571-573.

*Primary Examiner*—William L. Sikes
*Assistant Examiner*—Brian M. Healy
*Attorney, Agent, or Firm*—Antonelli, Terry & Wands

[57] ABSTRACT

An optical switch wherein a stripe layer of a compound semiconductor whose refractive index is changed by changing a carrier concentration thereof is disposed so as to cut off both optical waveguides at a position of a longer diagonal line of an intersection portion between the optical waveguides formed on a substrate of a compound semiconductor and intersecting each other at a predetermined angle, and the refractive index is changed by causing current to flow to the stripe layer.

41 Claims, 5 Drawing Sheets

OPTICAL SWITCHING DEVICE UTILIZING MULTIPLE QUANTUM WELL STRUCTURES BETWEEN INTERSECTING WAVEGUIDES

BACKGROUND OF THE INVENTION

The present invention relates to an optical switch in which an optical signal propagating through a certain optical waveguide is guided to this optical waveguide and another optical waveguide or any desired one selected from a plurality of optical waveguides. More particularly, it relates to an optical switch according to which individual optical signals within optical fibers for propagating light in an optical communication system can be respectively guided to any desired ones of a plurality of other optical fibers.

As prior-art optical switches, there have been proposed one which utilizes optical deflection based on the acoustooptic effect of an optical transmission medium, one which utilizes optical deflection based on the electrooptic effect of a medium, one which changes the coupling coefficient of a directional coupler by virtue of an electrooptic effect, one which comprises a directional coupler and an optical phase modulator in combination, etc. Any of them, however, has not completely satisfied all the fundamental characteristics of an optical waveguide switch such as low loss, low crosstalk and high speed. Moreover, the directional coupler type has had such disadvantages that a high-precision machining technique of 1-2 μm is required, that the length of the optical switch is great and that a long distance is necessitated in order to separate the coupling optical waveguides. The optical deflection type has had such disadvantages that electrodes of complicated structure are required and that a wide separation angle is not attained. These have led to the essential drawback that, when the number of matrices of the optical switch increases, the length of the element exceeds several cm, to incur the increase of transmission loss.

Here, the problems of a deflection type optical switch which is especially closely pertinent to the present invention will be described more in detail with reference to the drawings. The deflection type optical switch is also called a total reflection type optical switch, and the switch of this type is described in, e.g., the official gazette of Japanese Patent Laid-Open No. 54-7951.

FIG. 1 is a plan view showing the deflection type optical switch, while FIG. 2 is a sectional view showing a part of section II—II in FIG. 1. In the figures, numeral 1 designates a crystalline substrate of lithium niobate (LiNbO$_3$) or the like, which has an electrooptic effect, and numerals 2-1, 2-2, 3-1 and 3-2 optical waveguides which are formed in the surface of the crystalline substrate 1 by diffusing a metal such as Ti from the surface of the substrate crystal 1. Numerals 4-1, 4-2, 4-3 and 4-4 indicate the intersection portions of the respectively two optical waveguides intersecting each other. Each of numerals 5-1, 5-2, 5-3 and 5-4 indicates a pair of electrodes which are formed on the surface of the corresponding intersection portion in positions holding the longer diagonal line of the intersection portion therebetween. Although no illustration is made, each electrode is connected to an input terminal by a lead line, whereby a voltage of predetermined value can be applied selectively across the pair of electrodes. Thus, the electrodes construct field applying electrodes which apply an electric field to the corresponding intersection portion of the optical waveguides.

In the optical switch array arranged in this manner, when by way of example light 6 propagating through the optical waveguide 2-1 in the direction of arrow A in FIG. 1 is to be switched by the intersection portion 4-1 into the direction of arrow B so as to propagate through the optical waveguide 3-1, a voltage is applied across the field applying electrodes 5-1, to lower a refractive index in that part of the intersection portion 4-1 of the optical waveguides which is held between the electrodes 5-1. Then, the light 6 is reflected by the part of the lowered refractive index, and the propagating direction thereof is switched into the direction of the arrow B.

In this case, the polarity of the pair of electrodes 5-1 constituting the field applying electrodes 5-1 and the voltage to be applied thereacross differ depending upon the sort of the crystalline substrate 1, the direction of a crystallographic axis, etc., which therefore need to be selected properly. Regarding the extent to which the refractive index is lowered, an angle θ defined between the field applying electrode 5-1 and the optical waveguide 2-1 needs to be set so that the incident light may be totally reflected.

In a case where LiNbO$_3$ is used as the substrate crystal 1 and where the optical waveguides are formed by diffusing Ti sufficiently, the refractive index of the optical waveguide as well as the intersection portion for light having a wavelength of 6328 Å becomes about 2.22. The electrooptical coefficient γ of the substrate crystal 1 is on the order of $30 \times 10^{-12}$ m/V, and the refractive index change Δn of the intersection portion 4-1 based on the electrooptic effect is expressed by:

$$\Delta n = \tfrac{1}{2} n^3 \gamma E$$

where E denotes an electric field intensity. In this case, therefore, Δn=0.0005 holds at an electric field intensity of E=5 V/μm. The refractive index of the intersection portion 4-1 to which the electric field is applied becomes about 2.2195, and the total reflection angle is 88.784 degrees. Therefore, the optical switch may be so constructed that the angle θ defined between the optical waveguide 2-1 and the field applying electrodes 5-1 becomes 1.216 degree or less. More specifically, when the angle is assumed 1.1 degree, the separation angle (2θ) becomes 2.2 degrees, and the optical waveguides 2-1 and 3-1 may be caused to intersect at 2.2 degrees or less. When the electric field intensity to be applied is raised, also the angle θ widens. However, even when the high field intensity such as E=50 V/μm is applied, the separation angle (2θ) is as small as 7.7 degrees.

Usually, an optical fiber has a diameter of 125 μm or so. In order to couple the optical fiber and the optical switch, the interval between the optical waveguides 2-1 and 2-2 and the interval between the optical waveguides 3-1 and 3-2 taken at the middle positions of the optical waveguides must be at least 125 μm. When the separation angle (2θ) is 2.2 degrees, the length (L) of an optical switch portion becomes as great as 3.3 mm, so that optical integration becomes difficult with increase in the number of the optical switch portions. In this manner, the total reflection type has the disadvantage of the very great length of the entire optical switch, besides the high operating voltage of the optical switch. This is attributed to the fact that the electrooptical coefficient of LiNbO$_3$ is small.

As an expedient for solving the disadvantage, it is considered to employ the single crystal of a material of great electrooptical effect, for example, SBN (Sr-Ba-Nb-O). The crystal, however, might cause a scattering center in the optical waveguide due to an optical damage ascribable to the synergistic action of an electric field and light and is very unstable.

Letter d in FIG. 2 indicates the width of the part in which the refractive index lowers to totally reflect the propagating light when the predetermined voltage is applied across the electrodes (hereinbelow, termed "total reflection part").

The following references are cited to show the state of the art; i) the official gazette of Japanese Patent Laid-Open No. 54-7951, ii) the official gazette of Japanese Patent Laid-Open No. 54-33748, iii) the official gazette of Japanese Patent Laid-Open No. 56-66818.

DESCRIPTION OF THE INVENTION

An object of the present invention is to provide an optical switch free from the disadvantages of the prior arts mentioned above, which is small in size, low in dispersion and excellent in the degree of separation and which is capable of high integration, and an array of the optical switches.

In order to accomplish the object, the optical switch of the present invention consists in a deflection type optical switch in which a total reflection part is constructed of a stripe layer of a compound semiconductor having its refractive index changed by changing its carrier concentration, and means is comprised for changing the carrier concentration.

In order to change the refractive index of a medium, the electrooptic effect stated before is usually utilized. Besides, the refractive index can be changed by changing the carrier concentration of a group III–group V compound semiconductor such as a GaAs system or an InP system or a group II–group VI compound semiconductor. When carriers are injected into the compound semiconductor, the band gap of the material changes, and consequently, the absorption coefficient of the material changes. Further, since the absorption coefficient concerns the imaginary part of a complex refractive index, the change of the absorption coefficient results in a change in the imaginary part of the refractive index. In addition, the refractive index n and the dielectric constant $\epsilon$ have the relation of $n=\sqrt{\epsilon\mu}$ (where $\mu$ denotes the permeability of the substance). On the other hand, the real part and imaginary part of the dielectric constant expressed by a complex number are related by Kramers-Kronig's relations, so that the change of the imaginary part of the dielectric constant inevitably changes the real part thereof. As to the refractive index, accordingly, when the imaginary part thereof is changed by the change of the absorption coefficient with the change of the carrier concentration as described above, the real part thereof is inevitably changed.

In order to indicate examples of numerical values, FIG. 3 shows the spectrum of the change of the real part of a refractive index in a buried hetero semiconductor laser having a GaAs active layer. As seen from the figure, a great change in the refractive index arises in a place of photon energy slightly larger than a laser oscillation value. Two curves 1 and 2 in FIG. 3 indicate cases where the concentrations of carriers injected when currents are applied to the semiconductor laser are $1 \times 10^{18}$ cm$^{-3}$ and $0.5 \times 10^{18}$ cm$^{-3}$ respectively. As understood from FIG. 3, when the concentration of the injected carriers is not lower than $1 \times 10^{18}$ cm$^{-3}$ which corresponds to a carrier concentration in the case of laser oscillation, the magnitude of change of the refractive index is usually as large as at least $\pm 0.03$ in an absolute value in the vicinity of the photon energy of the laser oscillation. In the case of the index difference of 0.03, the separation angle ($2\theta$) between the two optical waveguides 2-1 and 3-1 increases surprisingly to 15.2 degrees in the application to the total reflection part of the total reflection type optical switch as shown in FIG. 1. This separation angle is increased by raising the injected carrier concentration. The separation angle ($2\theta$) is further widened to 21.6 degrees by effectively utilizing the plus side and minus side of the index difference (namely, by utilizing the index difference of 0.06) in such a way that, for example, an active layer is made of a plurality of materials the absorption edges of which are respectively rendered different so as to bring the wavelength of the plus peak position of the refractive index change into agreement with the wavelength of the minus peak position.

Needless to say, however, the absorption loss in this region is heavy. FIG. 4 shows the spectrum of the absorption coefficient. Curves 1 and 2 correspond respectively to the cases where the injected carrier concentrations are $1.0 \times 10^{18}$ cm$^{-3}$ and $0.5 \times 10^{18}$ cm$^{-3}$. In the vicinity of the laser oscillation value, an absorption coefficient of about $2 \times 10^2$ cm$^{-1}$ is exhibited. This corresponds to 869 dB/cm in terms of the transmission loss. In order to suppress the transmission loss of light to be below 0.5 dB/cm by way of example, the transmission length of this region which is substantially the width of the total reflection part needs to be made less than about 5 $\mu$m in the case of using the above materials. In the optical switch as shown in FIG. 1, it is desirable to reduce the transmission loss of light to the utmost. That is, when the width of the total reflection part, for example, the total reflection part under the pair of electrodes 5-1 in the intersection portion 4-1 of the optical waveguides in FIG. 1 (the width being d indicated in FIG. 2) is set at approximately 5 $\mu$m, an optical switch of great separation angle ($2\theta$) and low loss can be constructed as apparent from the foregoing explanation. In view of the separation angle, the length of the optical switch portion has been 3.3 mm in the preceding case of LiNbO$_3$, whereas it becomes 0.47 mm or less when the separation angle is 15.2 degrees as described above.

Moreover, when the index difference is large as in the optical switch of the present invention, there is the feature that the optical switch is usable, not only as a single-mode switch, but also as a multi-mode switch.

In the optical switch of the present invention, in order to effect the function of totally reflecting light, the total reflection part needs to have a width greater than approximately the wavelength of light for use. In addition, the optical waveguide portion other than the total reflection part needs to be of low loss, and it needs to be constructed of a GaAs high resistivity layer having a carrier concentration on the order of $10^{14}$ cm$^{-3}$ by way of example.

It is desirable that the thickness of the total reflection part in the direction perpendicular to the substrate surface is greater than the thickness of the optical waveguide, in order to propagate light through the optical waveguide in a desired direction without leakage.

The band gap of a compound semiconductor layer which constructs the total reflection part is set near an energy value which corresponds to the wavelength of light to be propagated. When the band gap is presumed from FIGS. 3 and 5, a magnitude somewhat smaller than the energy value of the propagation light seems to be more advantageous owing to a greater change in the refractive index of the propagation light. In this case, however, it is feared conversely that the absorption of light will increase to incur the transmission loss. Accordingly, it is rather more desirable that the photon energy of a position which is near the peak position of an index change in the spectrum of the refractive index of the compound semiconductor layer so that a desired index change can be attained by the injection of carriers and which is somewhat smaller than the band gap agrees with the photon energy of the propagation light. In practical use, therefore, it is desirable to select a compound semiconductor layer having a band gap with which the absorption coefficient at the wavelength of the propagation light preferably becomes $10^3$ cm$^{-1}$ or less, more preferably becomes $2 \times 10^2$ cm$^{-1}$ or less.

The compound semiconductor layer which constructs the total reflection part needs to be capable of changing the carrier concentration by at least an amount necessary for switching light, but means therefor need not be especially restricted. Usually a P—N junction is provided, a voltage is applied to the junction with the P portion as an active layer, to cause a forward current to flow, whereby carriers are injected into the stripe layer of the active layer for use as the total reflection part. The number of injection carriers can be changed by changing the current, in other words, the applied voltage. It is a technique well known in the field of semiconductor lasers that a P—N junction is provided in a compound semiconductor layer and that carriers are injected by causing a forward current to flow. Alternatively, a Schottky barrier, for example, can be used for changing the carrier concentration.

Optical waveguides have a width and a thickness as predetermined and a refractive index higher than in the surroundings, and are formed on a predetermined substrate. Usually, one waveguide or a plurality of waveguides parallel to each other intersect(s) one different waveguide or a plurality of different waveguides parallel to each other at the separation angle $2\theta$. It is common that the substrate, the waveguide and the total reflection part are made of compound semiconductor layers of the identical system.

It is needless to say that electrodes for causing current to flow through the total reflection part are provided. Usually, since respective layers constituting the P—N junction are provided substantially in parallel with the substrate, the forward current is in a direction substantially perpendicular to the substrate, and therefore, one of the electrodes is disposed on that part of the upper surface of the substrate which corresponds to the total reflection part. The other electrode, which may be connected to the substrate, is ordinarily disposed on the entire lower surface of the substrate. In the optical switch of the present invention, however, the carrier concentration of the compound semiconductor constructing the total reflection part may be changed by suitable means, and the electrodes need not be restricted to those mentioned above.

The total reflection part is so formed that the optical waveguides intersecting each other is cut off by the part at the position of the longer diagonal line of the rhomboid intersection portion of both the optical waveguides.

In general, a GaAs system, an InP system or an InGaAsP system is employed as the material of which the optical switch of the present invention is made. It is also possible to employ a group III-group V compound semiconductor such as a GaSb system or a GaAlAsSb system or a group II-group VI compound semiconductor such as a CdS system, a CdSe system, a ZnS system or a ZnSe system.

While, in the above, there has been explained the case where the total reflection part is formed of the GaAs active layer, the phenomenon appears more remarkably when the total reflection part is formed of a superlattice laminated of, for example, a GaAs layer and an AlGaAs layer.

FIG. 5 shows as an example the photon energy spectrum of a refractive index in a superlattice which is laminated of an AlGaAs barrier layer rendered 93 Å thick and a GaAs well layer rendered 83 Å thick. As seen from FIG. 5, a sharp dispersion curve having a width of 0.2 eV is exhibited near 1.5 eV in terms of the photon energy. This corresponds to having a width of 0.06 $\mu$m near 0.83 $\mu$m in terms of the wavelength of light. When carriers are injected more into the superlattice having such dispersion, the dispersion curve tends to flatten, and the change of the refractive index arises as in the semiconductor laser shown in FIG. 3. In the case of the superlattice structure, the dispersion is about 30 times greater than in the case of the single GaAs layer, and hence, the change of the refractive index greater by at least one order, namely, approximately $\pm 0.3$ can be expected. On this occasion, the separation angle ($2\theta$) of the two intersecting optical waveguides indicated in FIG. 1 becomes about 45 degrees, and the optical switch length (L) is completely as small as below about 200 $\mu$m, so that optical integration at a higher density is permitted. Besides, in the case of the superlattice structure, the absorption coefficient decreases suddenly at a laser oscillation value as illustrated in FIG. 6. This corresponds to an optical transmission loss of about 400 dB/cm, which is half or less of the loss in the case of the single GaAs layer. This brings forth the advantage that the width of the total reflection part can be set at a large value of about 10 $\mu$m.

As explained above, the semiconductor medium which gives rise to the index change based on the carrier injection is used for the region which causes the total reflection, whereby an optical switch of small size and high performance can be constructed.

As other merits of the optical switch of the present invention, it is mentioned that, since the optical switch is similar in arrangement to a semiconductor laser, it can be used as an external transformer when unitarily combined with the semiconductor laser, and that most of the prior-art optical switches operate only as single-mode switches, whereas the switch of the present invention functions also as a multi-mode switch. For example, in case of employing the foregoing superlattice structure, the optical switch functions also as the multi-mode switch when the separation angle ($2\theta$) of the optical waveguides is not set at 45 degrees but is set at about 20 degrees. Also in a case where the superlattice structure is not employed, the multi-mode switch can be constructed.

In the above explanation, the total reflection type optical switch has been referred to. However, with a construction wherein electrodes are arranged in the intersection portion of the optical waveguides at a certain optimum interval so as to utilize Bragg's diffraction, the Bragg diffraction unlike the total reflection is attained, and the separation angle of the optical waveguides becomes still wider.

As set forth above, the optical switch of the present invention typically comprises (i) a substrate of a compound semiconductor, (ii) at least two optical waveguides intersecting each other at a predetermined angle, said optical waveguides being made of long and narrow layers of a compound semiconductor of the same system as that of said substrate which are formed on said substrate and each of which has a width and a thickness as predetermined and a refractive index higher than in surroundings, and (iii) at least one stripe layer which is made of a layer of a compound semiconductor of the same system as that of said substrate and which has a width and a thickness as predetermined, said stripe layer being formed so as to cut off both said optical waveguides at a position of a longer diagonal line of a rhomboid intersection portion of said optical waveguides, a band gap of said stripe layer being close to a wavelength of light for use, so that when current is applied to said stripe layer to change a refractive index thereof, the light having propagated within one of said optical waveguides is reflected or diffracted in the stripe layer part so as to switch the propagation path of the light to the other optical waveguide.

DESCRIPTION OF THE PRESENTLY PREFERRED EMBODIMENTS

Now, the present invention will be described in detail in connection with embodiments with reference to FIGS. 7a-7g.

EMBODIMENT 1

Figure 7A:
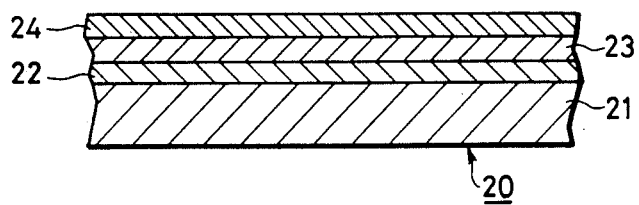
FIGS. 7a-7g are views for explaining the manufacturing process of one embodiment of an optical switch according to the present invention.

FIG. 7a shows a sectional view of a laminated substrate in which a superlattice layer, a clad layer and a metal layer for an electrode are stacked on a substrate.

An Sn-doped InP substrate whose surface is the (100) plane was used as the substrate 21. The layer of superlattice structure 22 in which an InGaAsP layer 80 Å thick and an InP layer 70 Å thick were successively and alternately stacked were grown on the substrate 21 to a thickness of 1.5 μm by the molecular beam epitaxy (MBE process). The superlattice layer 22 was made of a composition with which the band gap thereof corresponded to the wavelength 1.25 μm of light. Subsequently, the InP clad layer 23 which was about 2 μm thick was formed on the superlattice layer 22 by the liquid phase epitaxy (LPE process), and the electrode metal layer 24 made of, for example, a Cr/Au stacked layer was formed thereon to a thickness of about 0.3 μm. Thus, the laminated substrate 20 was fabricated.

Figure 1:
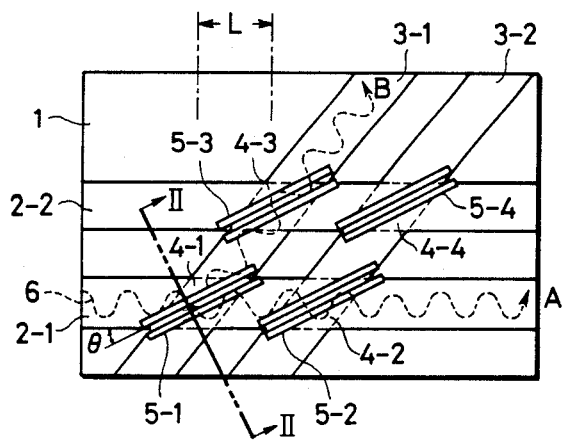
FIG. 1 is a plan view showing a total reflection type optical switch in a prior art.
Figure 2:
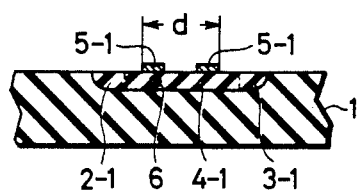
FIG. 2 is a sectional view showing the essential portions of section II—II in FIG. 1.
Figure 3:
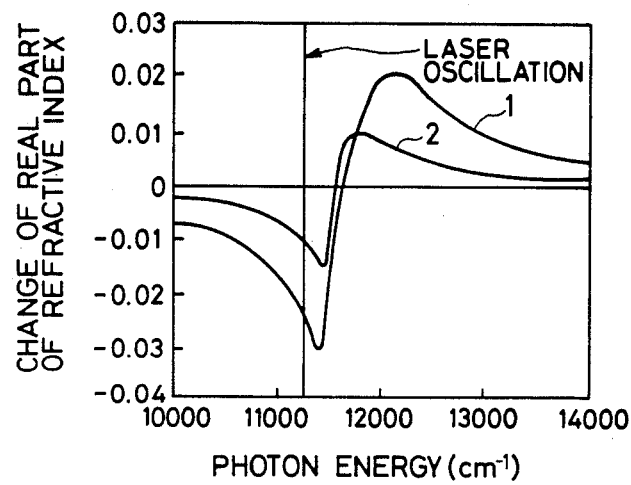
FIGS. 3 and 4 are diagrams respectively showing the spectrum of a refractive index change and the spectrum of an absorption coefficient in a GaAs buried hetero semiconductor laser.
Figure 4:
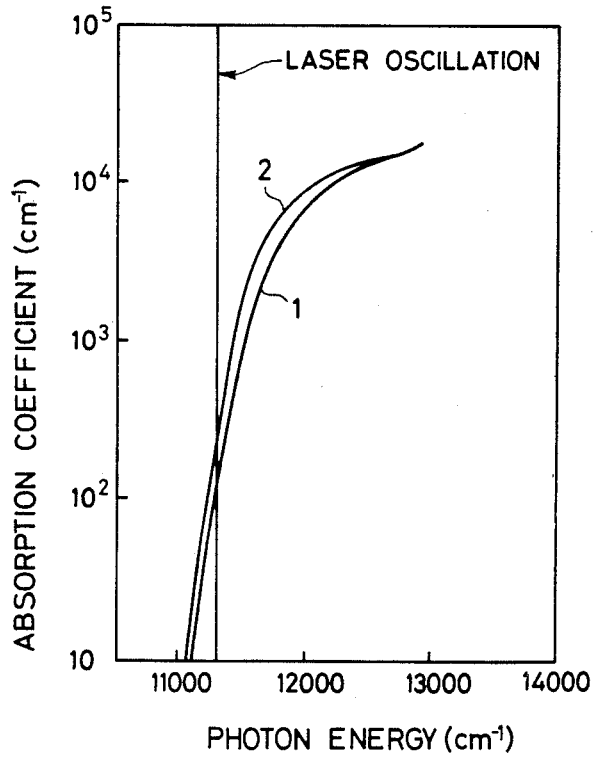
Figure 5:
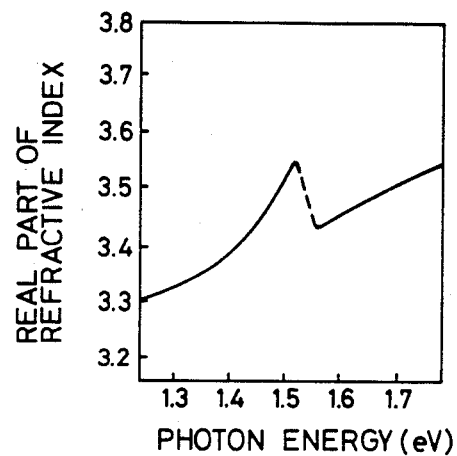
FIGS. 5 and 6 are diagrams respectively showing the spectrum of a refractive index and the spectrum of an absorption coefficient in a laser in which a GaAsAlGaAs superlattice structure is employed as an active layer.
Figure 6:
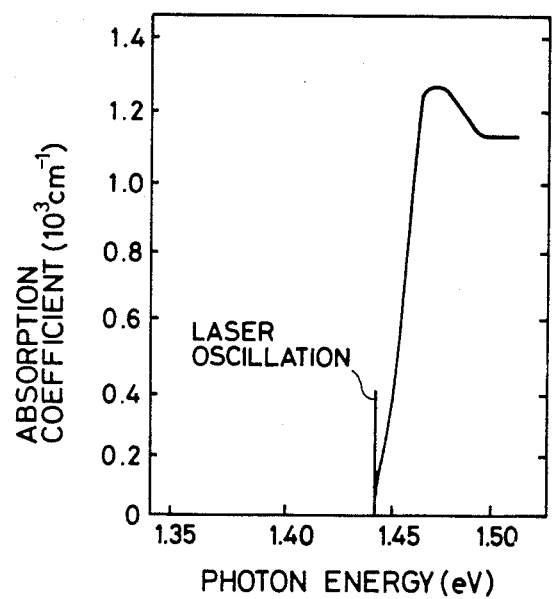

Next, in the present embodiment, total reflection parts are formed along with the electrodes. In the foregoing case of FIG. 1, the electrodes 5-1 to 5-4 exist as the paired electrodes in the intersection portions 4-1 to 4-4 between the optical waveguides 2-1, 2-2 and 3-1, 3-2. In contrast, in the present embodiment, as seen from a plan view shown in FIG. 7b, one stripe electrode on one side is disposed on each of the longer diagonal lines of the intersection portions 27-1 to 27-4 between optical waveguides 25-1, 25-2 and 26-1, 26-2 enclosed with dotted lines and to be provided in the laminated substrate 20 by a later step, together with the total reflection part under the stripe electrode, while the electrode on the other side (made of, for example, a Cr/Au stacked layer similar to the electrode metal layer 24 mentioned above) is disposed as a common electrode 31 having a thickness of about 0.3 μm on the whole rear surface of the laminated substrate 20. In order to obtain such structure, the Cr/Au stacked layer about 0.3 μm thick was first formed on the whole rear surface of the laminated substrate. Thereafter, each photoresist pattern 28 identical in shape to the electrode pattern was formed on that position of the metal layer 24 which corresponds to the stripe electrode to be formed here.

Figure 7B:
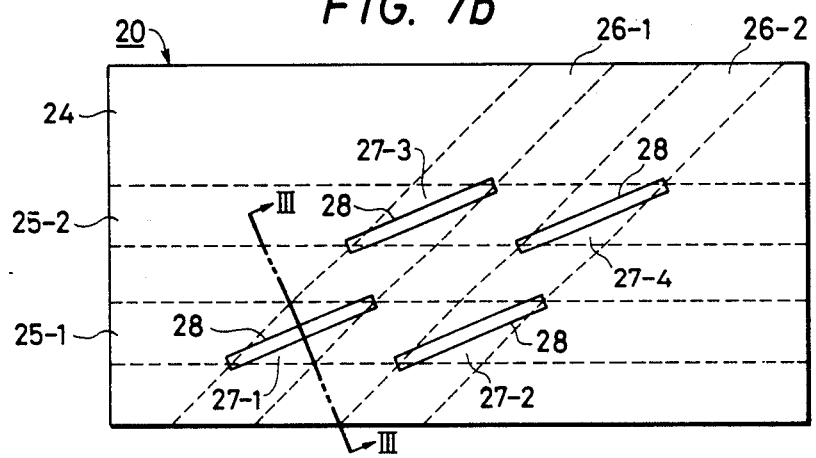
Figure 7C:
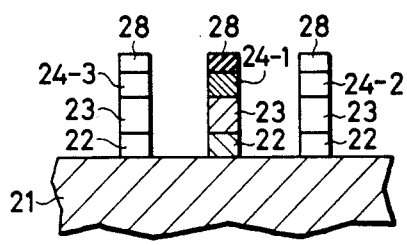

Next, as shown in FIG. 7c, using the photoresist pattern 28 as a mask, unnecessary parts around the mask were removed by the well-known photoetching to the extent that the InP substrate 21 was reached, thereby to form each of the stripe electrodes 24-1 to 24-4 having a length of 30 μm and a width of 4 μm under the photoresist pattern 28 and to simultaneously leave the striped InP layer 23 and superlattice layer 22 under the electrode.

Figure 7D:
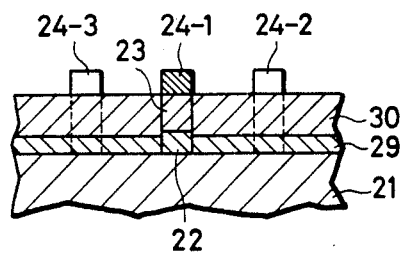

At the next step, as shown in FIG. 7d, an InGaAsP layer 29 being 1 μm thick was grown by the LPE process on the InP substrate 21 exposed around the electrodes 24-1 to 24-4, and an InP layer 30 being 2.5 μm thick was grown thereon. In this case, the carrier concentrations of the InGaAsP layer 29 and the InP layer 30 were on the order of $10^5$ cm$^{-3}$, and the transmission loss of light was not greater than 2 dB/cm. FIGS. 7c and 7d are sectional views showing section III—III in FIG. 7b.

Figure 7E:
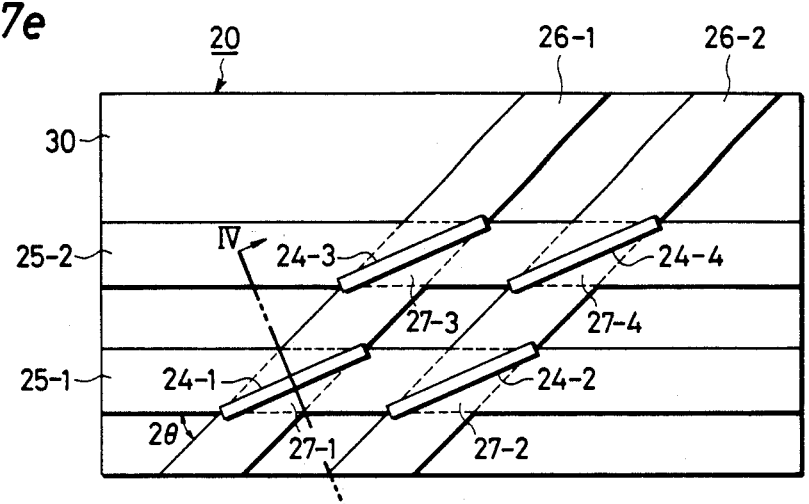
Figure 7F:
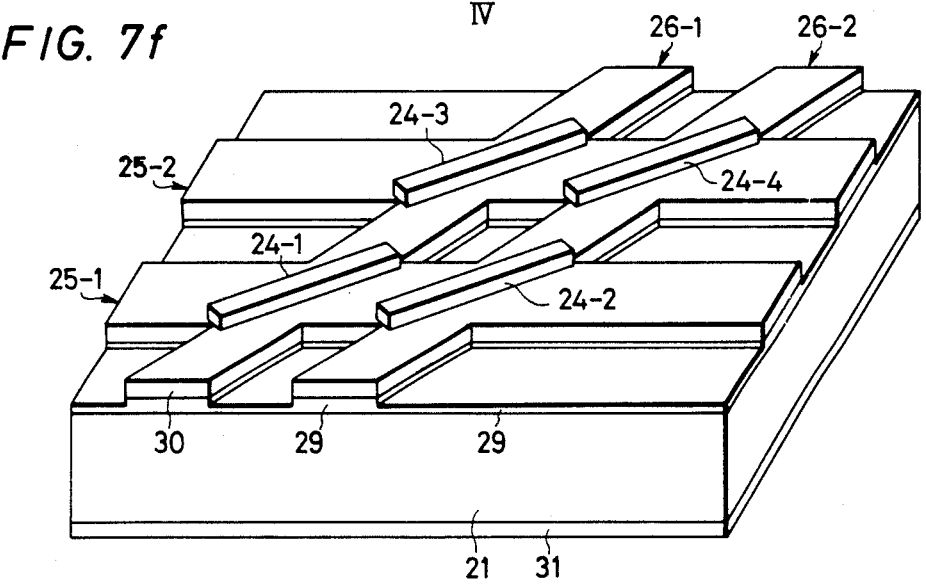

Thereafter, as shown in a plan view of FIG. 7e and a perspective view of FIG. 7f, the optical waveguides 25-1 to 26-2 around the stripe electrodes 24-1 to 24-4, previously indicated as being enclosed with the dotted lines in FIG. 7b, were formed into a ridge type having a width of 5 μm and a height of 3 μm by removing the InP layer 30 and the InGaAsP layer 29 with the ion milling so as to leave the InGaAsP layer 29 to a thickness of 0.5 μm. Then, the optical switch of the present invention was fabricated. The separation angle (2θ) of the optical waveguides at this time was set at 15 degrees, and the interval between the optical waveguides was set at 125 μm.

Figure 7G:
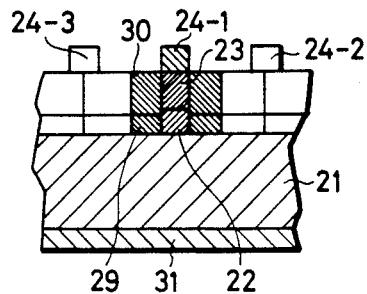

The refractive indices of the InGaAsP layer 29 and the InP layer 30 were 3.30 and 3.21, respectively. FIG. 7g is a sectional view showing section IV—IV in FIG. 7e. Although no illustration is made, the respective electrodes are connected to input terminals by lead lines, and a voltage of predetermined value can be applied across the selected stripe electrode and the electrode 31 on the rear surface.

A semiconductor laser beam at a wavelength of 1.3 μm was caused to enter the optical switch fabricated as described above, which was 1.6 mm long and which had two sets of waveguides, each set consisting of four parallel waveguides. Then, it has been found that the optical waveguides are not single-mode waveguides but that they are multi-mode ones. The extinction ratio of the optical switch at the time at which a forward current was caused to flow to the superlattice layer by about 23 mA was as small as below −30 dB, and the transmission loss was as good as below 2 dB. The switching time was about 0.8 nsec enough to ensure a high speed, and the forward applied voltage necessary for an operation was about 0.9 V which was a value easy of use. Further, the working precision was to the extent of providing the total reflection part about 4 μm wide in the present embodiment by way of example, and the optical switch can be readily produced with the present-day technology for manufacturing a semiconductor device.

EMBODIMENT 2

An optical switch was produced similarly to Embodiment 1 except that the superlattice layer 22 was replaced with a single InGaAsP layer of a composition with which the band gap thereof corresponded to the wavelength 1.25 μm of light, so as to set a separation angle of 5 degrees. The optical switch was 2.0 mm long, and had multi-mode waveguides for a laser beam at a wavelength of 1.3 μm. The extinction ratio at the forward current of 23 mA was −25 dB, the transmission loss was below 5 dB, the switching time was 0.9 nsec, and the applied voltage was 1 V. All these values are favorable. Moreover, the optical switch was easy of production likewise to Embodiment 1.

As described above, according to the present invention, a refractive index can be greatly changed merely by applying current, and hence, an optical switch array capable of high integration which has a simple arrangement and which is applicable even to the multi-mode switching of light can be provided, so that great effects are attained in practical use.

Obviously many modifications and variations of the present invention are possible in the light of the above teachings. It is therefore to be understood that within the scope of the appended claims the invention may be practiced otherwise than as specifically described.

What is claimed is:

1. An optical switch for propagating a predetermined wavelength of light comprising (i) a substrate of a compound semiconductor, (ii) at least two optical waveguides intersecting each other at a predetermined angle, said optical waveguides being formed on said substrate and being made of long and narrow layers of a compound semiconductor of the same system as that of said substrate, (iii) at least one stripe layer which is made of a layer of a compound semiconductor of the same system as that of said substrate and which has a width and a thickness as predetermined, said stripe layer being formed so as to cut off both optical waveguides at a position of a longer diagonal line of a rhomboid intersection portion of said optical waveguides, a value of energy corresponding to a band gap of said stripe layer being close to a value of energy corresponding to the predetermined wavelength of light to be propagated, and (iv) means for changing a carrier concentration of said stripe layer, the carrier concentration changing means being able to inject a sufficient density of carriers into the stripe layer to cause the refractive index of said strip layer to change to such an extent that said propagating light is reflected or diffracted at said stripe layer.

2. An optical switch according to claim 1, wherein said stripe layer includes electrodes for applying current.

3. An optical switch according to claim 2, wherein said stripe layer is an active layer of a P−N junction.

4. An optical switch according to claim 2, wherein each of the compound semiconductors of said substrate, said optical waveguides and said stripe layer is one member selected from the group consisting of a group III –group V compound semiconductor and a group II-group VI compound semiconductor.

5. An optical switch according to claim 3, wherein each of the compound semiconductors of said substrate, said optical waveguides and said stripe layer is one member selected from the group consisting of a group III –group V compound semiconductor and a group II-group VI compound semiconductor.

6. An optical switch according to claim 4, wherein each of the compound semiconductors of said substrate, said optical waveguides and said stripe layer is at least one compound semiconductor selected from the group consisting of GaAs system, InP system, InGaAsP system, ZnS system and a ZnSe system compound semiconductors. GaSb system, GaAlAsSb system, CdS system, CdSe system, 7. An optical switch according to claim 6, wherein each of the compound semiconductors of said substrate, said optical waveguides and said stripe layer is at least one compound semiconductor selected from the group consisting of GaAs system, InP system and InGaAsP system compound semiconductors.

8. An optical switch according to claim 2, wherein the electrode having the same pattern as that of said stripe layer is disposed on said stripe layer directly or indirectly.

9. An optical switch according to claim 8, wherein the other electrode is disposed on a whole rear surface of said substrate.

10. An optical switch according to claim 1, wherein at least two optical waveguides, which are parallel to each other and have a predetermined interval therebetween, intersect the other at least one optical waveguide.

11. An optical switch according to claim 1, wherein the stripe layer has a width greater than the predetermined wavelength of light to be propagated.

12. An optical switch according to claim 1, wherein the stripe layer has a thickness in the direction perpendicular to the substrate surface that is greater than the thickness of the optical waveguides.

13. An optical switch according to claim 1, wherein the compound semiconductor of which the at least one stripe layer is made has a band gap with an absorption coefficient for the predetermined wavelength of light to be propagated of $10^3$ cm$^{-1}$ or less.

14. An optical switch according to claim 1, wherein the P−N junction is in parallel with the substrate.

15. An optical switch according to claim 1, wherein the at least one stripe layer is made of a superlattice.

16. An optical switch according to claim 15, wherein the superlattice is a lamination of layers, the lamination of layers being a lamination of GaAs and AlGaAs layers.

17. An optical switch according to claim 15, wherein the superlattice is a lamination of layers, the lamination of layers being a lamination of InP and InGaAsP layers.

18. An optical device comprising at least two optical waveguides intersecting or connecting each other at a predetermined region, at least one carrier injection region which resides at least in the vicinity of said predetermined region and in which carrier injection region a refractive index thereof can be changed by injecting carriers, and means for injecting carriers into said carrier injection region, wherein a value of energy corresponding to a band gap of the material composing said carrier injection region is close to a value of energy corresponding to a wavelength of propagating light in the optical device.

19. An optical device according to claim 13, wherein the carrier injection region resides in said predetermined region.

20. An optical device according to claim 18, wherein said carrier injection region is comprised of a semiconductor junction structure, and said means for injecting carriers is constituted so as to apply a current in a forward direction of said junction structure.

21. An optical device according to claim 18, wherein said carrier injection region is comprised of a semiconductor P—N junction structure, and said means for injecting carriers is constituted so as to apply a current in a forward direction of said junction structure.

22. An optical device according to claim 19, wherein said carrier injection region is made of a compound semiconductor.

23. An optical device according to claim 22, wherein said compound semiconductor is one member selected from the group consisting of a group III–group V compound semiconductor and a group II–group VI compound semiconductor.

24. An optical device according to claim 23, wherein said compound semiconductor is at least one compound semiconductor selected from the group consisting of GaAs system, InP system, InGaAsP system, GaSb system, GaAlAsSb system, CdS system, CdSe system, ZnS system and ZnSe system compound semiconductors.

25. An optical device according to claim 24, wherein said compound semiconductor is at least one compound semiconductor selected from the group consisting of GaAs system, InP system and InGaAsP system compound semiconductors.

26. An optical device according to claim 18, wherein said carrier injection region is formed of a superlattice.

27. An optical device according to claim 26, wherein said superlattice is a lamination of a GaAs layer and an ALGaAs layer.

28. An optical device according to claim 26, wherein said superlattice is a lamination of an InP layer and an InGaAsP layer.

29. An optical device comprising at least (i) a light transmitting pathway having a predetermined light entrance and a plurality of light exits, (ii) a region in said pathway in which a refractive index changes by changing a carrier concentration, and (iii) means for changing said carrier concentration in said region whereby the direction of light propagating through said pathway is changed by a change of said refractive index due to the change in said carrier concentration, said light propagating through said pathway thereby being transmitted through a predetermined light exit of the plurality of light exits, wherein a value of energy corresponding to a band gap of the material composing said carrier concentration changing region is close to a value of energy corresponding to a wavelength of the propagating light.

30. An optical device according to claim 29, wherein said carrier concentration changing region is comprised of a semiconductor junction structure, and said means for changing said carrier concentration is constituted so as to apply a current in a forward direction of said junction structure.

31. An optical device according to claim 29, wherein said carrier concentration changing region is comprised of a semiconductor P—N junction structure, and said means for changing said carrier concentration is constituted so as to apply a current in a forward direction of said junction structure.

32. An optical device according to claim 29, wherein said carrier concentration changing region is made of compound semiconductor.

33. An optical device according to claim 32, wherein said compound semiconductor is one member selected from the group consisting of a group III–group V compound semiconductor and a group II–group VI compound semiconductor.

34. An optical device according to claim 33, wherein said compound semiconductor is at least one compound semiconductor selected from the group consisting of GaAs system, InP system, InGaAsP system, GaSb system, GaAlAsSb system, CdS system, CdSe system, ZnS system and ZnSe system compound semiconductors.

35. An optical device according to claim 34, wherein said compound semiconductor is at least one compound semiconductor selected from the group consisting of GaAs system, InP system and InGaAsP system compound semiconductors.

36. An optical device according to claim 29, wherein said carrier concentration changing region is formed of a superlattice.

37. An optical device according to claim 36, wherein said superlattice is a lamination of a GaAs layer and an AlGaAs layer.

38. An optical device according to claim 36, wherein said superlattice is a lamination of an InP layer and an InGaAsP layer.

39. An optical device according to claim 18, wherein the material of said carrier injection region has a band gap such that an absorption coefficient for the wavelength of the propagatig light in the optical device is $10^3$ cm$^{-1}$ or less.

40. An optical device according to claim 39, wherein the material of the carrier injection region has a band gap such that the absorption coefficient for the wavelength of the propagating light is $2\times 10^2$ cm$^{-1}$ or less.

41. An optical device according to claim 29, wherein the material of the carrier concentration changing region has a band gap such that an absorption coefficient for the light propagating through said pathway is $10^3$ cm$^{-1}$ or less.

* * * * *